J. PLATT.
Flour Mill.
No. 4,334.
Patented Dec. 26, 1845.
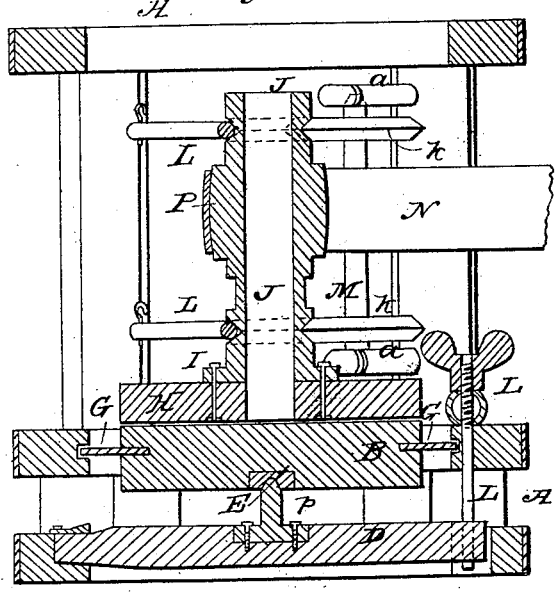
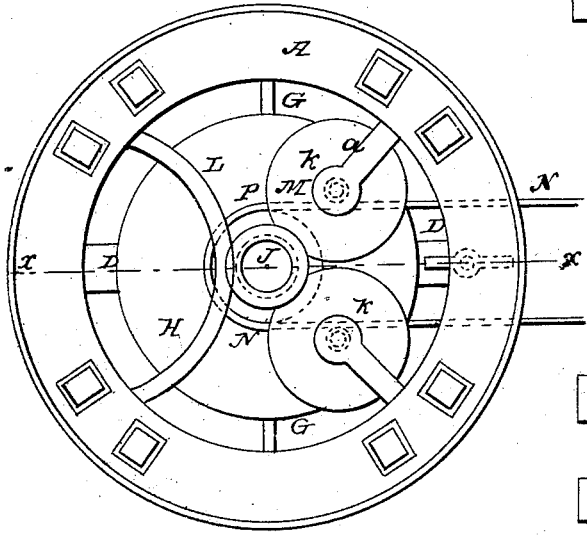
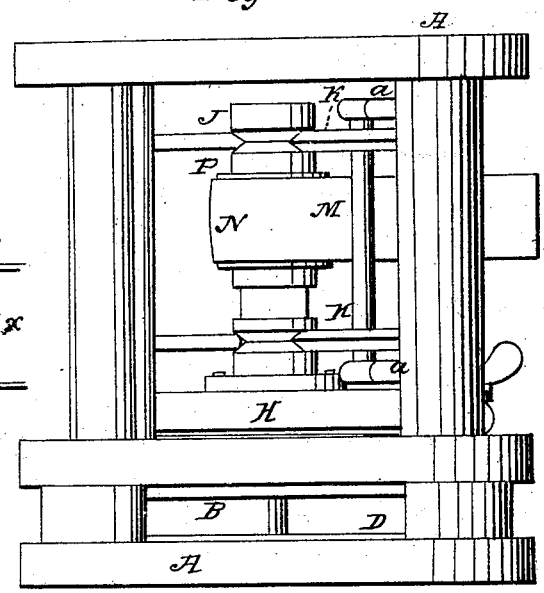

UNITED STATES PATENT OFFICE.

JOSIAH PLATT, OF BRIDGEPORT, CONNECTICUT.

MILL FOR GRINDING.

Specification of Letters Patent No. 4,334, dated December 26, 1845.

*To all whom it may concern:*

Be it known that I, JOSIAH PLATT, of Bridgeport, in the county of Fairfield and State of Connecticut, have invented a new and useful Improvement in the Construction of Mills for Grinding Grain and other Materials, which is described as follows, reference being had to the annexed drawings of the same, making part of this specification.

Figure 1, is a plan of the mill. Fig. 2, is a vertical section at the line $x\ x$ of Fig. 1. Fig. 3, is a side elevation of the mill.

A, is the frame made of suitable size, strength and material, to contain and support the several parts hereafter described. It is represented as round in the drawings, but it may be made of any convenient form or proportion.

B is the bed stone with a socket plate attached to the center of its under side, resting bedded and balanced on the pivot $p$ fastened to the top of the lever D; to one end of which the screw L is attached so that it may be raised or lowered and thus placing and holding the under stone at the required level to give the degree of fineness desired. The pivot may be attached to the bed B and fitted to the socket connected with the lever D.

G, G, are pins projecting horizontally from the sides of the bed stone B and entering corresponding grooves in the frame. The pins may project from the frame and enter grooves in the sides of the bedstone B as prefered.

H is the upper stone or runner having an eye of corresponding size to the hollow in the spindle.

J, J, is a hollow spindle having a flange I at the lower end to which the runner is firmly bolted and through which and the eye of the upper stone the grain passes to the bed stone to be ground.

The spindle J, J has a groove around its circumference near each end corresponding in shape with the circumference or periphery of the wheels K and a segment bar L attached to the frame, and thus suspending the spindle and runner so that they may revolve with their weight upon the grain between the surfaces of said runner and bed stone.

The pressure on the grain may be increased as much as required by drawing up the bed stone B with the screw L and thus increasing the pressure upon the grain above the real weight of the runner and all the revolving parts connected with it.

K, K are horizontal friction wheels as aforesaid with vertical axles M, M there being either two wheels on each axle or an axle to each wheel the points or pivots of which turn in suitable boxes in arms ($a$) projecting inward from the frame. The spindle and upper stone are set in motion by means of a band N passed around a pulley P thereon leading to the driving power.

Now what I claim as my invention and desire to secure by Letters Patent is—

The suspension of the upper stone by being firmly fastened to a flange connected with a hollow spindle through which the mill is fed said hollow spindle having groovings around its circumference near each end and fitting the edges of the corresponding friction wheels arranged around said spindle, and the arrangement of the segment bar all in connection and combination as aforesaid.

In testimony whereof I have hereunto subscribed my name before two witnesses this 3d day of October A. D. 1845.

JOSIAH PLATT.

Witnesses:
WM. P. ELLIOT,
R. H. CLEMENTS.